(12) United States Patent
Hariman et al.

(10) Patent No.: US 7,705,579 B1
(45) Date of Patent: Apr. 27, 2010

(54) APPARATUS AND METHOD FOR FASTER UNLOADING OF TRANSIENT RESPONSE IN A SYNCHRONOUS BUCK SWITCHING REGULATOR

(75) Inventors: George A. Hariman, Sunnyvale, CA (US); Faruk J. Nome, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 200 days.

(21) Appl. No.: 12/014,014

(22) Filed: Jan. 14, 2008

(51) Int. Cl.
*G05F 1/575* (2006.01)
*G05F 1/618* (2006.01)

(52) U.S. Cl. ..................... 323/284; 323/285

(58) Field of Classification Search ........... 323/224, 323/282, 284, 285, 288, 351, 901; 363/49
See application file for complete search history.

(56) References Cited

U.S. PATENT DOCUMENTS

| | | | |
|---|---|---|---|
| 6,396,252 B1 * | 5/2002 | Culpepper et al. | 323/285 |
| 6,618,274 B2 | 9/2003 | Boylan et al. | |
| 6,711,039 B2 | 3/2004 | Brkovic | |
| 6,828,766 B2 * | 12/2004 | Corva et al. | 323/284 |
| 7,224,590 B2 | 5/2007 | Lin et al. | |

OTHER PUBLICATIONS

Baranwal, S. K. et al., "Self Oscillating Control of a Synchronous DC-DC Buck Converter," 35th Annual IEEE Power Electronics Specialists Conference, Aachen Germany, Jun. 2004, 5:3671-3674.

(Continued)

*Primary Examiner*—Gary L Laxton
(74) *Attorney, Agent, or Firm*—Darby & Darby PC; Matthew M. Gaffney

(57) ABSTRACT

A synchronous buck regulator controller is provided. The regulator controller includes switch control circuitry, an unloading event detection circuit, an inductor current detection circuit, and a synchronous switch control logic circuit. In operation, the regulator controller controls a main switch and a synchronous switch to control the buck regulation. The unloading event detection circuit is arranged to detect an unloading event, and to assert an unloading event signal if such an event is detected. The inductor current detection circuit is arranged to assert an inductor current detection signal if the inductor current is close to zero. The synchronous switch control logic circuit is arranged to block the synchronous switch from turning on if the unloading event signal is asserted and the inductor current detection signal is not asserted. However, if the inductor current detection signal is subsequently asserted while the unloading event signal is still asserted, the synchronous switch control logic circuit stops blocking the synchronous switch from turning on.

20 Claims, 7 Drawing Sheets

OTHER PUBLICATIONS

Yan, Chao et al., "A High Efficiency 3KW DC/DC Converter with Novel External Driven Synchronous Rectifer," 26th Annual International Telecommunications Energy Conference, Sep. 2004, 638-641.

Zhou, Xunwei et al., "Improve Light Load Efficiency for Synchronous Rectifier Buckconverter," Fourteenth Annual Applied Power Electronics Conference and Exposition, Dallas Texas, Mar. 1999, 1:295-302.

Yao, Liangbin et al., "Zero-Voltage-Switching Buck-Flyback Isolated DC-DC Converter with Synchronous Rectification," Twenty-First Annual IEEE Applied Power Electronics Conference and Exposition, Mar. 2006, 545-550.

"Xphase Phase IC With Fault and Overtemp Detect," International Rectifer, IR3088APbF datasheet, No. PD94704, 2005, 33 pages.

"N-Channel 30-V (D-S) MOSFET," Vishay Siliconix, datasheet Si442DY, Apr. 2003, 4 pages, http://www.datasheetcatalog.com/datasheets_pdf/S/I/4/4/SI4442DY.shtml downloaded Feb. 13, 2008).

"MBR3035PT—MBR3060PT," Fairchild Semiconductor, MBR3060PT datasheet, 3 pages, http://www.fairchildsemi.com/ds/MB%2FMBR3060PT.pdf (downloaded Feb. 13, 2008).

* cited by examiner

APPARATUS AND METHOD FOR FASTER UNLOADING OF TRANSIENT RESPONSE IN A SYNCHRONOUS BUCK SWITCHING REGULATOR

FIELD OF THE INVENTION

The invention is related to synchronous buck regulators, and in particular but not exclusively, to an apparatus and method for a increasing the speed of load decrease responses while still allowing the inductor current to go negative.

BACKGROUND OF THE INVENTION

A switching regulator may be configured to provide an output voltage (Vout) in response to an input voltage (Vin). Typically, a switching regulator includes an inductor that is coupled to a switch. In operation, the inductor current is a triangle wave current based on the opening and closing of the switch, and an output capacitor provides Vout from the inductor current. Also, the switch is controlled by a control signal, where the duty cycle or the frequency of the control signal is typically modulated based on negative feedback.

Additionally, a diode-rectified switching regulator employs a diode to rectify the inductor current. A synchronous switching regulator employs a synchronous switch rather than a diode. In a synchronous switching regulator, the inductor current can be positive or negative. Additionally, other topologies may be employed, such as a SEPIC topology or a CUK topology.

BRIEF DESCRIPTION OF THE DRAWINGS

Non-limiting and non-exhaustive embodiments of the present invention are described with reference to the following drawings, in which.

DETAILED DESCRIPTION

Figure 1:
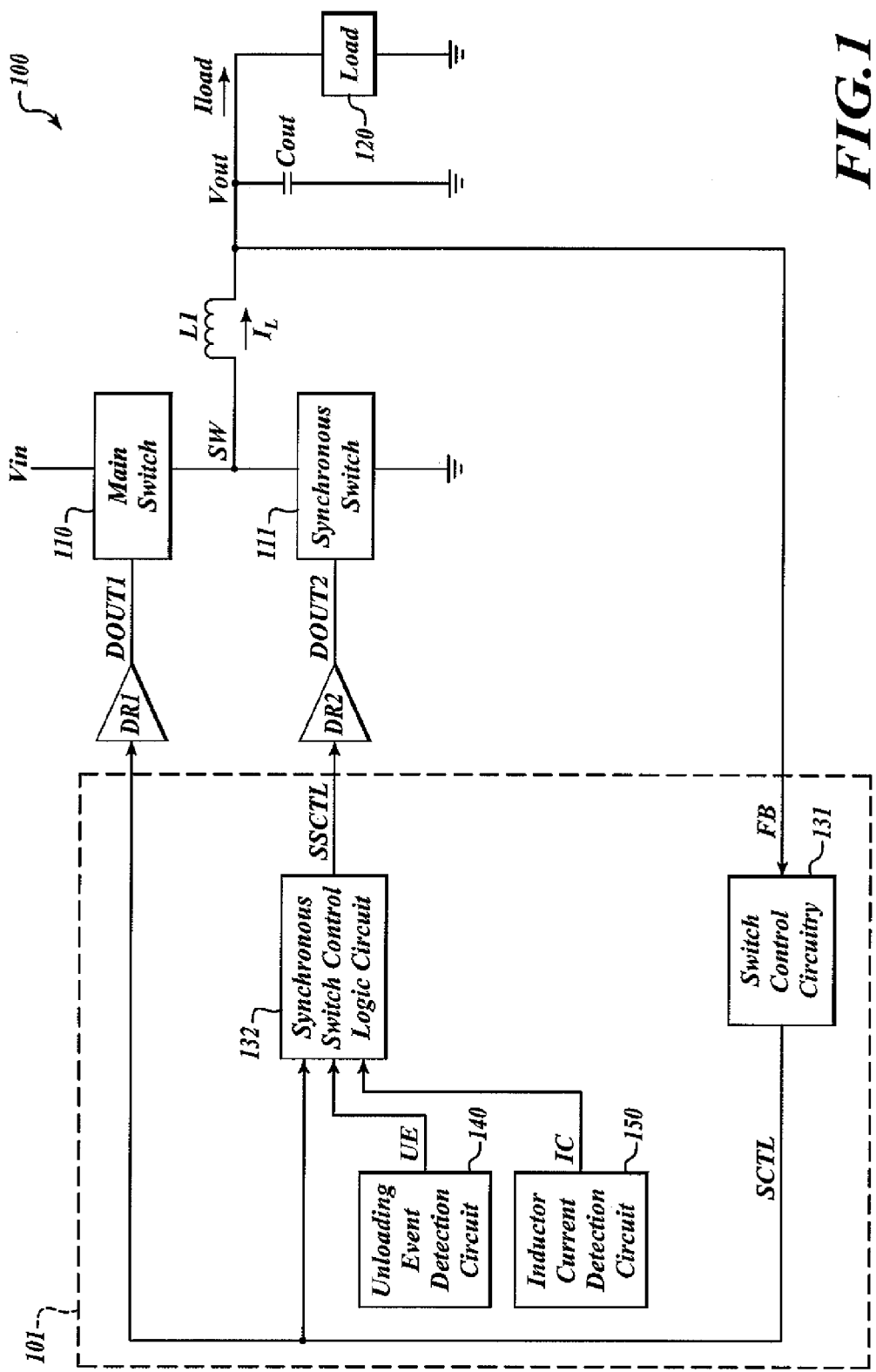
FIG. 1 shows a block diagram of an embodiment of a synchronous buck regulator circuit driving a load.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. Similarly, the phrase "in some embodiments," as used herein, when used multiple times, does not necessarily refer to the same embodiments, although it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa.

Briefly stated, the invention is related to a synchronous buck regulator controller. The regulator controller includes switch control circuitry, an unloading event detection circuit, an inductor current detection circuit, and a synchronous switch control logic circuit. In operation, the regulator controller controls a main switch and a synchronous switch to control the buck regulation. The unloading event detection circuit is arranged to detect an unloading event, and to assert an unloading event signal if such an event is detected. The inductor current detection circuit is arranged to assert an inductor current detection signal if the inductor current is close to zero. The synchronous switch control logic circuit is arranged to block the synchronous switch from turning on if the unloading event signal is asserted and the inductor current detection signal is not asserted. However, if the inductor current detection signal is subsequently asserted while the unloading event signal is still asserted, the synchronous switch control logic circuit stops blocking the synchronous switch from turning on.

FIG. 1 shows a block diagram of an embodiment of synchronous buck regulator circuit 100 and load 120. Synchronous buck regulator circuit 100 may include driver DR1, driver DR2, main switch 110, synchronous switch 111, inductor L1, output capacitor Cout 120, and regulator controller 101. Regulator controller 101 is a synchronous buck regulator controller that provides regulated output voltage Vout, which in turn drives load 120 via load current Iload. Regulator controller 101 includes switch control circuitry 131, synchronous switch control logic circuit 132, unloading event detection circuit 140, and inductor current detection circuit 150.

In operation, inductor L1 provides current $I_L$. More specifically, inductor L1 is arranged such that a voltage substantially given by Vin-Vout is across inductor L1 when switch 110 is closed. Also, capacitor Cout is an output capacitor for regulator circuit 100. Regulator controller 101 is arranged to provide switch control signal SCTL and synchronous switch control signal SSCTL based, in part, on signal FB, which may be voltage Vout or a signal that is based in part on voltage Vout. In one embodiment, driver DR1 is arranged to provide driver output signal DOUT1 from switch control signal SCTL, and driver DR2 is arranged to provide driver output signal DOUT2 from synchronous switch control signal SSCTL. Additionally, switch 110 is configured to open and close responsive to signal DOUT1, and synchronous switch 111 is configured to open and close responsive to signal DOUT2.

Switch control circuitry 131 is arranged to provide signal SCTL from feedback signal FB to control regulation. In one embodiment, buck regulator controller 101 is a PWM buck regulator controller, and switch control circuitry includes an error amp and a pulse width modulation circuit. In another embodiment, buck regulator controller 101 is a hysteretic bang-bang regulator controller, and switch control circuitry 131 includes a hysteretic comparator. In yet another embodiment, switch control circuitry 131 is a constant on-time (COT) regulator controller, and switch control circuitry 131 includes a comparator and a one-shot circuit. In these various embodiments, the error amplifier (e.g. in the case of a PWM buck regulator controller or the like), or the comparator (in the case of a hysteretic bang-bang regulator controller, COT regulator controller, or the like) may be referred to generically as a comparison circuit. In some embodiments, the comparison circuit receives a reference signal Vref (not shown in FIG. 1) at one input of the comparison circuit and signal FB and another input of the comparison circuit.

Unloading event detection circuit 140 is arranged to detect an unloading event associated with load 120, and to assert unloading event signal UE if an unloading event is detected. One example of an unloading event is if load 120 is disconnected or otherwise disappears, so that load current Iload becomes zero or approximately zero. Another example of an unloading event is a load step decrease, in which the load current Iload decreases relatively rapidly but does not necessarily go to zero.

Inductor current detection circuit 150 is arranged to detect whether the inductor current is approximately zero. If inductor current detection circuit 150 detects that the inductor current is approximately zero, inductor current detection circuit 150 asserts inductor current detection signal IC.

Synchronous switch control logic circuit 132 is arranged to provide synchronous switch control signal SSCTL based, at least in part, on signals SCTL, UE, and IC. In one embodiment, under normal operating conditions, signal SSCTL is provided as the logical opposite of signal SCTL. In other embodiments, depending on the logic of main switch 110 and synchronous switch 111, signals SCTL and SSCTL may be the same under normal operating conditions (for example, if main switch 110 is a PMOSFET and synchronous switch 111 is an NMOSFET). In this way, main switch 110 and synchronous switch 111 may be controlled so that synchronous switch 111 is on whenever main switch 110 is off, and vice versa. There may be various fringe conditions in which synchronous switch control logic circuit 132 may provide signal SSCTL so that this is not the case. For example, in some embodiments, synchronous switch control logic circuit 132 may implement a break-before-make scheme, so that there is a slight delay when main switch 110 turns off before synchronous switch 111 turns on. Further, in some embodiments, regulator controller 101 includes one or more types of fault protection such as undervoltage protection, overvoltage protection, overcurrent protection, and/or the like, in which synchronous switch 111 is disabled. Additionally, synchronous switch 111 may be disabled in certain modes outside of normal operation, such as soft start.

In addition to these fringe conditions (if utilized), synchronous switch control logic circuit 132 is arranged to block synchronous switch 111 from turning on (even when main switch 110 is off), if signal UE is asserted and signal IC is not asserted. However, if signal IC is asserted, synchronous switch control logic circuit 123 stops blocking synchronous switch 111 from turning on, even if signal UE is still asserted.

Although one embodiment of regulator 100 of FIG. 1 is a voltage mode, PWM regulator topology, the invention is not so limited. Embodiments of the invention may be used in virtually any inductive-based buck switching regulator topology switching regulator topology, including a current mode control, hysteretic control, constant on-time control, adaptive constant on-time control, gated oscillator, transformer-isolated versions of the various topologies, and/or the like. These embodiments and others are within the scope and spirit of the invention.

Figure 2:
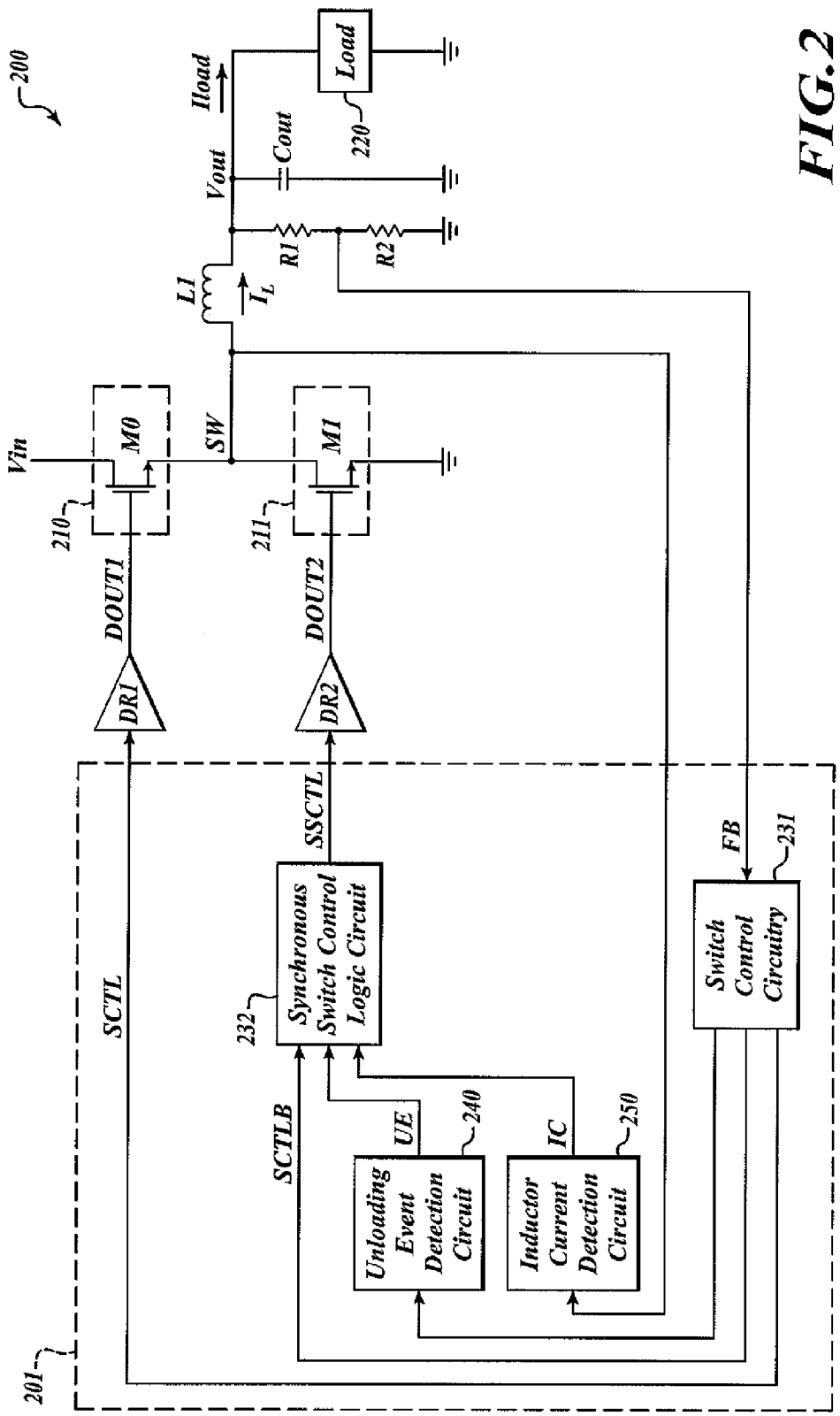
FIG. 2 illustrates a block diagram of an embodiment of the synchronous buck regulator circuit and load of FIG. 1.

FIG. 2 illustrates a block diagram of an embodiment of the synchronous buck regulator 200, which may be employed as an embodiment of synchronous buck regulator 100 of FIG. 1. Synchronous buck regulator 200 further includes resistor R1 and resistor R2. Switch 210 includes MOSFET M0. Switch 211 includes MOSFET M1.

Inductor current detection circuit 250 may further receive signal SW, as shown in FIG. 2. Switch control circuitry 231 may further provide signal SCTLB, the logic inverse of signal SCTL, as illustrated in FIG. 2. As shown in FIG. 2, in some embodiments, synchronous switch control logic circuit 232 may receive signal SCTLB rather than signal SCTL. Also, unloading event detection circuit 240 may receive one or more signals from switch control circuitry 231.

Resistors R1 and R2 are arranged as a voltage divider to provide feedback signal FB from output voltage Vout.

Further, synchronous switch control logic circuit 232 is arranged to block synchronous switch 211 from turning on (even when main switch 210 is off), if signal UE is asserted and signal IC is not asserted. However, if signal IC is asserted, synchronous switch stops blocking synchronous switch 211 from turning on even if signal UE is still asserted.

The reasons for blocking the synchronous switch from turning on may be understood as follows. For a non-synchronous buck regulator, the voltage on the switch node during the time the high-side FET is off is equal to −VF, where VF is the forward voltage drop of the freewheeling diode. For synchronous regulation, however, the voltage on the switch node is equal to (Iload*Rdson). During an unloading event, when the load current started out positive, the switch node is then at −(Iload*Rdson). The latter should be smaller than the former as this is the intention of the design to increase efficiency for low duty cycle systems (VF for Schottky diodes at higher current levels can only be as low as 700 mV while Rdson of modern low-side FET for low duty cycle applications rarely exceed 50 mΩ).

During an unloading event, the output voltage Vout normally experiences a positive excursion. The magnitude of the excursion highly depends on the control loop bandwidth and also on how fast the inductor current can discharge the Vout excursion on the output capacitor. The rate of discharge of the inductor current is proportional to the voltage across the inductor. For a synchronous buck regulator, this voltage is smaller than that of a non-synchronous buck regulator for the reason described in the previous paragraph. The Vout excursion is larger in a synchronous buck regulator circuit (this is the trade-off made by choosing an efficient synchronous buck regulator).

In many systems, especially high-current, low-voltage combinations such as power supplies for microprocessors in laptops, servers and PCs, the unloading transient requirement is often more restrictive than the loading transient. Minimizing the unloading transient is valuable because it reduces the bulk capacitance needed thus saving area and cost.

However, in regulator 200, in order to have an efficient system where the positive excursion on the Vout during load current unloading is minimized, a synchronous buck regulator system is employed where a modification is made during the unloading transient. In order to get a larger voltage across the inductor to accelerate the discharge of the Vout excursion, the low-side FET is forced to be turned off during the time when the inductor current drops down to zero, thereby letting the low-side FET body diode conduct the inductor current. As soon as the inductor current drops enough to reach zero, the low-side FET is then turned back on in order to let negative current further discharge the Vout excursion and letting the control loop regulate Vout back to its set point. Accordingly, regulator 200 is an efficient synchronous buck regulator system with a faster response to unloading transients.

The following are the steps that the synchronous buck regulator controller 201 of FIG. 2 takes during an unloading transient:

1) Detecting whether an unloading transient has occurred;

2) If an unloading transient is detected, block the turn on of synchronous switch 211 until either the unloading has ceased, or until the inductor current $I_L$ hits zero. Inductor current $I_L$ conducts through the transistor M1 body diode thus creating a larger voltage across inductor L1 to speed the inductor current discharge;

3) If the unloading still persists and inductor current hits zero, then synchronous switch control logic 232 allows MOSFET M1 to turn back on (i.e., it undoes the blocking).

When an unloading event occurs, both FET M0 and the FET M1 are turned off. Inductor current $I_L$ then discharges through the transistor M1 body diode. The voltage drop across inductor L1 is thus (−VBD−Vout), where VBD is the forward voltage of the M1 FET body diode (normally this quantity is listed in the datasheet for power MOSFET, and for higher rated power MOSFET this quantity is typically at 0.75V).

Voltage Vout experiences a positive excursion in which Vout increases when an unloading event occurs. By turning off both FET M0 and FET M1, the inductor discharges more quickly, thus reducing the Vout excursion from what it would be if synchronous switch 211 were not blocked from turning on. However, by blocking synchronous switch 211 from turning on until inductor current $I_L$ reaches zero, and then allowing the synchronous switch 211 to turn on so that inductor current $I_L$ can go below zero, the Vout excursion is decreased even further than if synchronous switch 211 were to remain blocked through the entire unloading event.

Figure 3:
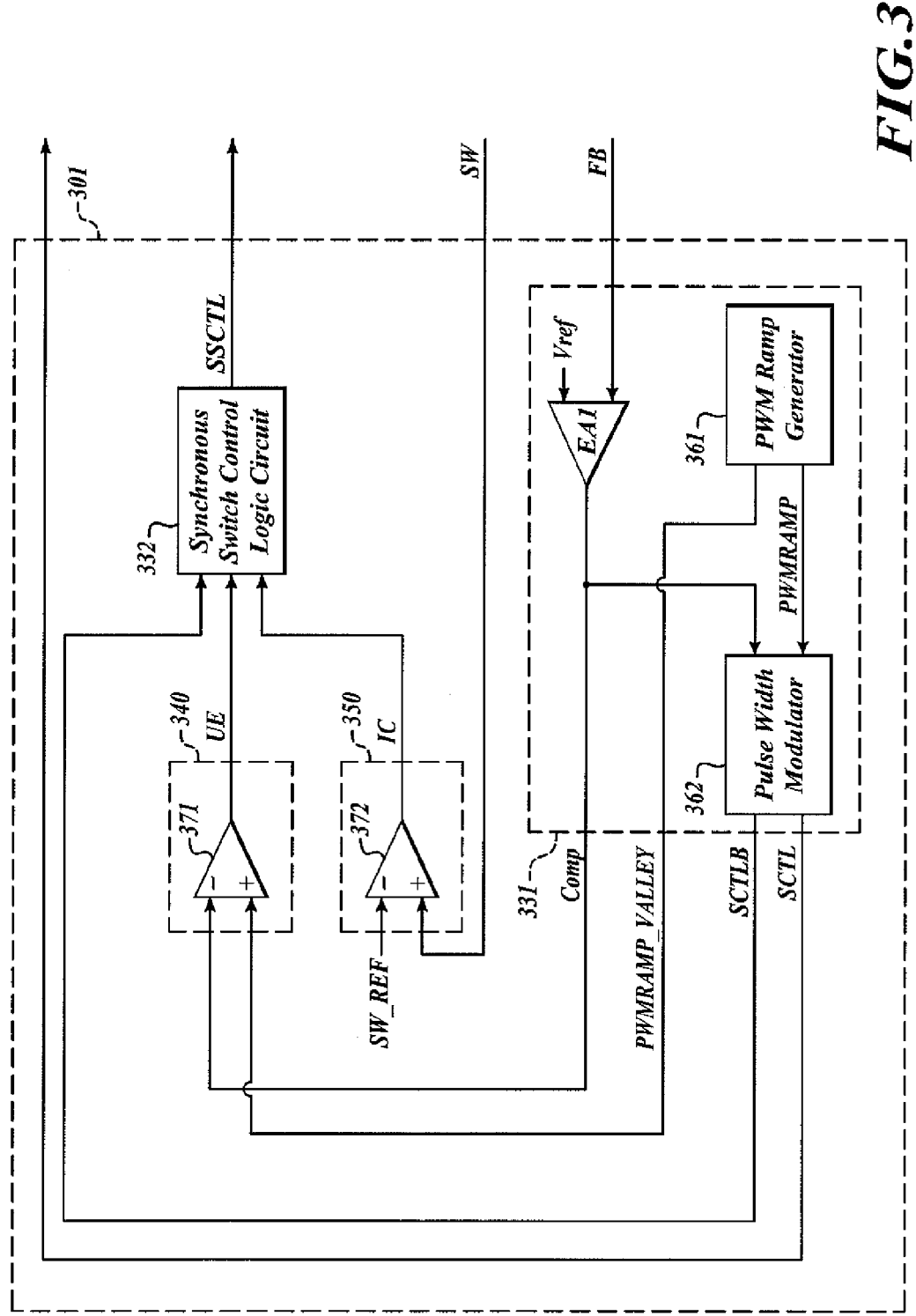
FIG. 3 shows a block diagram of an embodiment of the regulator controller of FIG. 2.

FIG. 3 shows a block diagram of regulator controller 301, which may be employed as an embodiment of regulator controller 201 of FIG. 2. Switch control circuitry 331 includes PWM ramp generator 361, pulse width modulator 362, and error amp EA1. Unloading event detection circuit 371 includes comparator 371. Inductor current detection circuit 350 includes comparator 372. In some embodiments, regulator controller 301 may include additional components, such as fault detection circuitry. Error amplifier EA1 is arranged to receive reference voltage Vref and feedback signal FB. Further, error amplifier EA1 is arranged to provide error signal Comp based, in part, a difference between reference voltage Vref and feedback signal FB. PWM ramp generator 361 is arranged to provide PWM ramp signal PWMRAMP and signal PWMRAMP_VALLEY. Also, signal PWMRAMP is a sawtooth signal having a minimum voltage (i.e., valley voltage) of PWMRAMP_VALLEY. Pulse width modulator 362 is arranged to receive signal Comp and signal PWMRAMP. Further, pulse width modulator 362 is arranged to provide signal SCTL by pulse width modulating signal Comp, and to provide signal SCTLB such that signal SCTLB is the logical opposite of signal SCTL.

Figure 4:
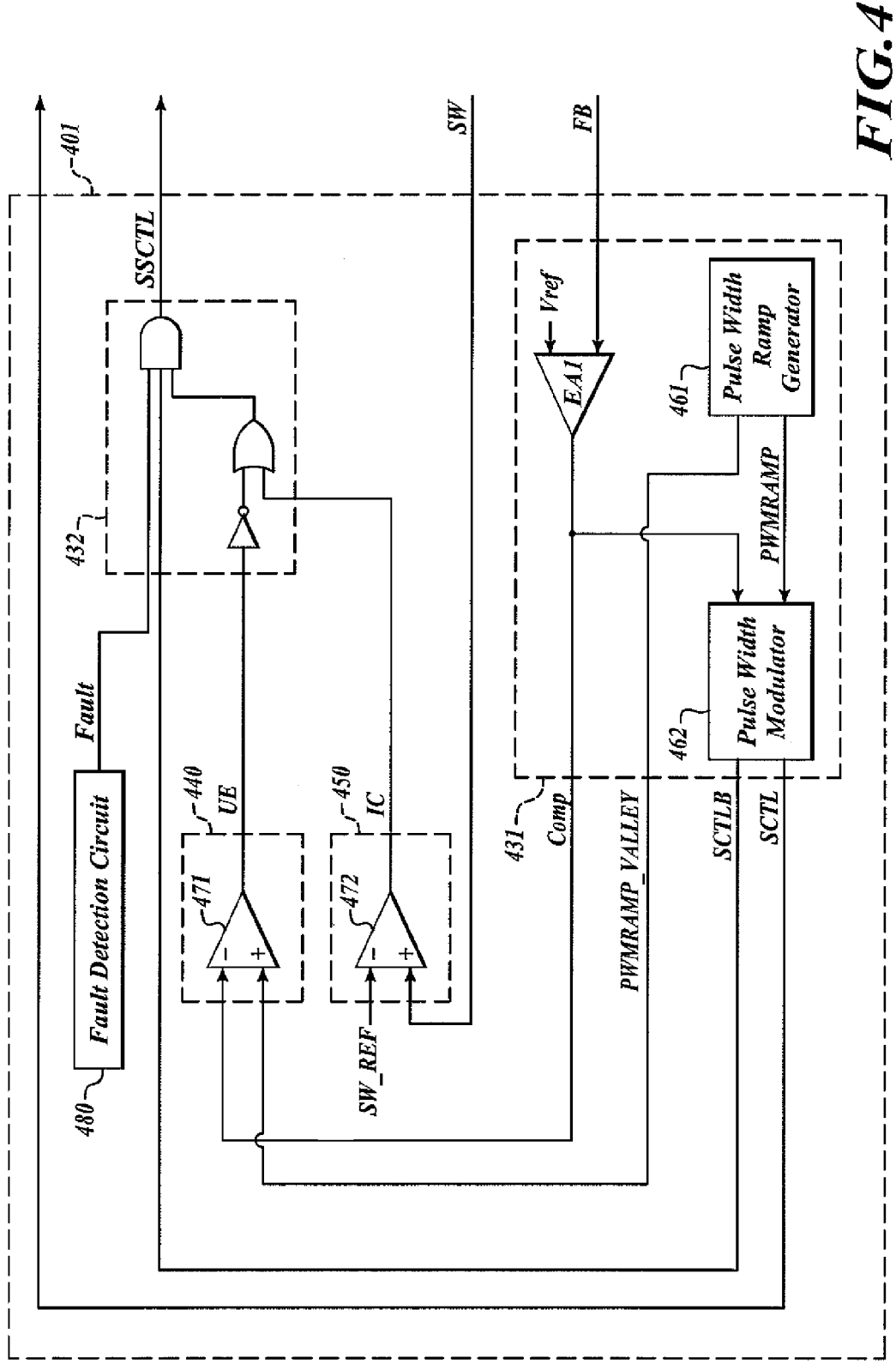
FIG. 4 illustrates a block diagram of an embodiment of the regulator controller of FIG. 3.

Although one particular embodiment of switch control circuitry 431 is illustrated in FIG. 4, other embodiments may be employed. For example, as previously discussed, in other embodiments, switch control circuitry instead may include a hysteretic bang-bang comparator, or a comparator and a one-shot circuit, a gated oscillator, or the like. These variations and others are within the scope and spirit of the invention.

Comparator 371 is arranged to compare signal Comp with signal PWMRAMP_VALLEY, and to provide signal UE based on the comparison. In some embodiments, comparator 371 is a hysteretic comparator.

When an unloading transient occurs, in some embodiments, error amplifier EA1 sets its output to the lowest possible value in order to request minimum duty cycle on the high-side FET M0 of FIG. 2. In some embodiments, this lowest value is slightly less than the bottom of the PWM ramp (in one embodiment, regulator controller 301 is a voltage mode controller having a fixed PWM ramp which has a fixed valley while a current mode has a PWM ramp that tracks the load current and the internal sensed ramp also has a bottom corresponding to zero current). Accordingly, unloading event detection circuit 340 can detect an unloading transient when signal Comp hits the bottom (and beyond) of signal PWMRAMP. When an unloading event occurs, signal Comp drops below PWMRAMP_VALLEY. Comparator 371 detects this occurrence and trips, asserting signal UE if signal Comp drops below PWMRAMP_VALLEY.

Although a particular embodiment of unloading event detection circuit 340 is illustrated in FIG. 3, other embodiments may employed. For example, in one embodiment, instead of detecting an unloading event by comparing signal Comp to signal PWMRAMP_VALLEY, an unloading event may be detected by comparing signal FB against a fixed threshold that is higher than reference voltage Vref. In yet another embodiment, instead of detecting an unloading event by comparing signal Comp to signal PWMRAMP_VALLEY, in other embodiments, an unloading event may be detected by detecting current Iload, comparing current Iload to a reference, and asserting signal UE if current Iload decreases to zero or experiences a relatively rapid step decrease. These variations and others are within the scope and spirit of the invention.

Comparator 372 is arranged to compare signal SW with signal SW_REF, and to provide signal IC based on the comparison. In some embodiments, comparator 372 is a hysteretic comparator. Comparator 372 is arranged to trip if the body diode associated with transistor M1 of FIG. 2 becomes back-biased. Accordingly, signal SW_REF is a negative reference value having a magnitude that is less than the forward voltage drop of the body diode of transistor M1 of FIG. 2. In one embodiment, signal SW_REF is a reference voltage of about −300 mV. In other embodiments, other suitable values may be employed.

If signal UE is asserted, indicating an unloading condition, then if inductor current is flowing, the body diode of transistor M1 of FIG. 2 is forward-biased, so that the voltage associated with SW is equal to the forward voltage diode drop of the body diode below zero volts. However, if the inductor current becomes zero or approximately zero, the body diode associated with transistor M1 of FIG. 2 will become back-biased, and the voltage associated with SW will change to approximately zero. Comparator 372 detects this condition, so that during an unloading condition, comparator 372 trips, and asserts signal IC if the body diode of transistor M1 of FIG. 2 is back-biased, indicating that inductor current $I_L$ is at or near zero. This way, inductor current $I_L$ is allowed to drop below zero during the unloading event.

In one embodiment, signal IC remains asserted until inductor current $I_L$ becomes positive again.

In another embodiment, signal IC is asserted when inductor reaches approximately zero, is asserted for only a short pulse, and is then de-asserted. In this embodiment, if signal UE is asserted, and signal IC is not asserted, signal SSCTL is blocked so that the synchronous switch cannot turn on. This continues until either signal UE is de-asserted, or until signal IC is asserted. If signal IC is asserted, signal SSCTL is no longer blocked from turning on, and is not blocked again until signal UE subsequently goes from a non-asserted logic level to an asserted logic level.

Although a particular embodiment of inductor current detection circuit 350 is illustrated in FIG. 3, other embodiments may employed. For example, in other embodiments, the event of the inductor current being approximately at zero or below zero may instead be detected by current sense circuitry, such as with a series resistor placed in series with inductor L1, and providing the voltage across the series resistor to a zero cross comparator (where the current sense voltage across the series resistor is proportional to the inductor current associated with inductor L1). These variations and others are within the scope and spirit of the invention.

FIG. 4 illustrates a block diagram of an embodiment of regulator controller 401, which may be employed as an embodiment of regulator controller 301 of FIG. 3. Regulator controller 401 further includes fault detection circuit 480. Also, as shown, one embodiment of synchronous switch control logic circuit 432 includes an inverter, an OR gate, and a three-input AND gate.

Fault detection circuit 480 is arranged to detect one or more fault conditions, such as an undervoltage protection event, an overvoltage protection event, an overcurrent protection event, and/or the like. Further, fault detection circuit 480 is arranged to asserted signal Fault (asserted logic low in the embodiment illustrated) if a fault condition is detected.

Figure 5:
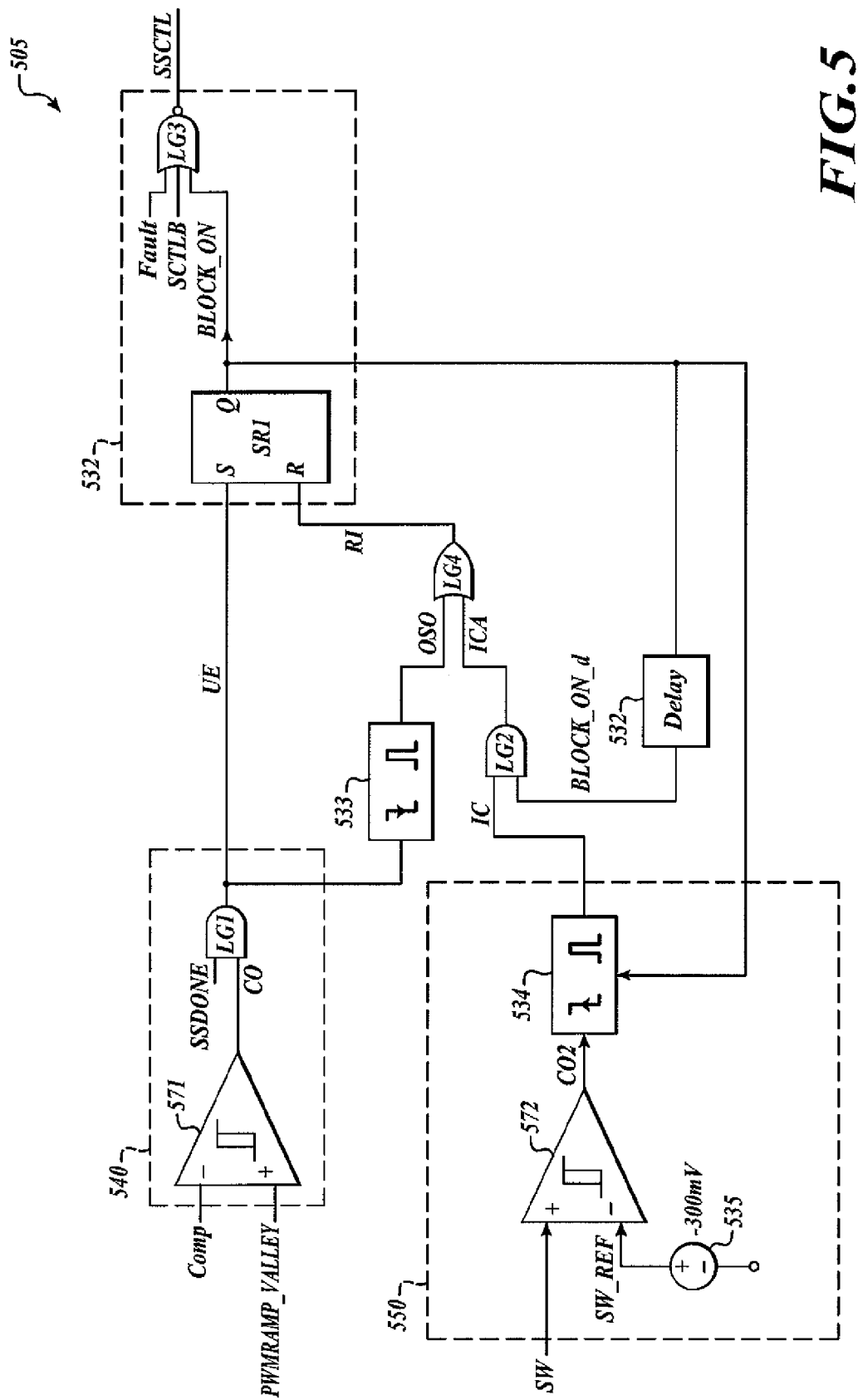
FIG. 5 shows a block diagram of an embodiment of a portion of the regulator controller of FIG. 3.

FIG. 5 shows a block diagram of an embodiment of a portion (505) of an embodiment of regulator controller 301 of FIG. 3. Portion 505 includes the regulator controller except for switch control circuitry 331, and except for fault detection circuitry (if present). Portion 505 further includes delay circuit 532, one-shot circuit 533, logic gate LG2, and logic gate LG4. Unloading event detection circuit 540 further includes logic gate LG1. Additionally, inductor current detection circuit 550 further includes one-shot circuit 534 and reference voltage circuit 535. Synchronous switch control logic circuit includes SR latch SR1 and logic gate LG3. In the embodiment illustrated, logic gate LG1 is an AND gate, logic gate LG2 is an AND gate, logic circuit LG3 is a NOR gate, and logic circuit LG4 is an OR gate, although the exact gate(s) used may depend on the logic employed.

Comparator 571 is arranged to compare signal Comp with signal PWMRAMP_VALLEY, and to provide comparator output signal CO based on the comparison. Also, logic gate LG1 is arranged to receive signal SSDONE at one input, to receive signal CO and another input, and to provide unloading event signal UE at its output. Signal SSDONE is asserted (high in this embodiment) if soft-start is not occurring. Normally at the beginning of soft start when the soft-start reference (not shown) is low and Vout is low, signal COMP starts out lower than PWMRAMP_VALLEY. As this is not an unloading transient, it is not desirable to assert signal UE under this condition, so the output of comparator 571 is ANDed with signal SSDONE.

SR latch SR1 is arranged to receive signal UE at its S input, to receive reset input signal RI at its R input, and to provide signal Block_on at its output. Also, signal Block_on is asserted to block (prevent) the synchronous switch from turning on. Logic gate LG3 is arranged to receive signal Fault at one input, to receive signal SCTLB at another input, and to receive signal Block_on at yet another input, and to provide signal SSCTL at its input.

Additionally, one-shot circuit 533 is a one-shot circuit that is arranged to provide signal OSO such that signal OSO is normally unasserted, but is asserted for a fixed duration pulse when a falling edge occurs in signal UE. Delay circuit 532 is arranged to receive signal Block_on, and to provide signal Block_on_d such that signal Block_on_d is a delayed version of signal Block_on. Also, logic gate LG2 is arranged to receive to receive signal IC at one input, to receive signal Block_on_d at another input, and to provide signal ICA at its output. Logic gate LG4 is arranged to receive signal OSO at one input, to receive signal ICA at another input, and to provide signal RI at its output.

Comparator 572 is arranged to provide signal CO2 at its output. One-shot circuit 534 is a one-shot circuit that is arranged to provide signal IC such that signal IC is normally unasserted, but is asserted when a rising edge occurs in signal CO2. When signal IC is asserted in response to a rising edge in signal CO2, signal IC remains asserted until signal Block_on becomes unasserted. When signal Block_on becomes unasserted, signal IC becomes unasserted, and remains unasserted until another rising edge occurs in signal CO2.

When an unloading transient occurs, as previously discussed, signal UE is asserted. Two things can happen after this.

One is if inductor current $I_L$ unloads and either ends up at a non-zero value or if load current $I_{load}$ to begin with is not too high, then signal Comp will start to climb above PWMRAMP_VALLEY to continue commanding the steady-state duty cycle. If this happens, one-shot circuit 533 produces a one-shot pulse when comparator 571 senses signal Comp below PWMRAMP_VALLEY and un-trips. This one-shot pulse in signal OSO would then reset SR latch SR1, to de-assert signal Block_on.

The other case is that if the unloading is severe, then it is most likely that the signal Comp would still be below the PWMRAMP_VALLEY while inductor current $I_L$ has already hit zero. If this case is true, then inductor current detection circuit 550 asserts signal IC.

During the time the low-side FET M1 of FIG. 2 is not allowed to turn on, the positive inductor current conducts through the low-side FET M1 body diode and thus the SW node sits at −VBD (the forward voltage drop of the low-side body diode). As current $I_L$ tends towards zero, the body diode will stop conducting and SW will then climb back to Vout or ring towards Vout. This transition in SW is detected by inductor current detection circuit 572 to let low-side FET M1 operate in the normal fashion.

Since portion 505 blocks the turn on of low-side FET M1, SW may sit at VBD for a prolonged period of time (i.e., a couple of switching cycles). Normally SW only goes below ground for short periods of time during either ringing or during dead time in between high-side FET M0 and low-side FET M1 turn-on.

Accordingly, the designer should take care in layout of all devices attached to the SW node to ensure sufficient minority carrier pickup rings are placed around those devices in order to prevent minority carrier injection into nearby devices that may cause unwanted latchup to occur.

Figure 6A:
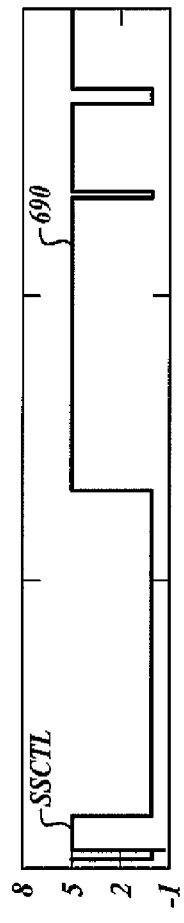
FIGS. 6A-6E illustrates timing diagrams of waveforms of embodiments of signals of the circuit of FIG. 5.
Figure 6B:
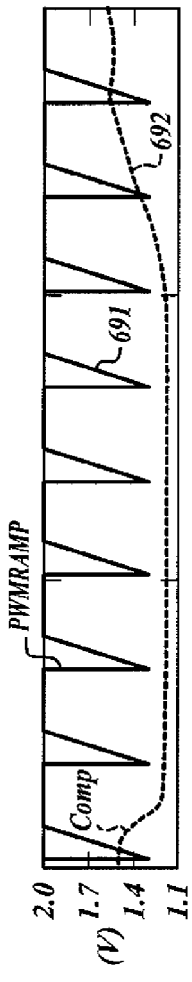
Figure 6C:
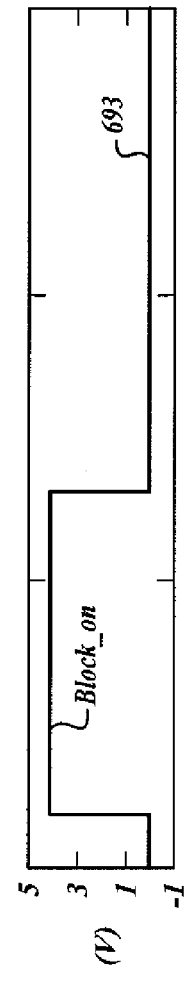
Figure 6D:
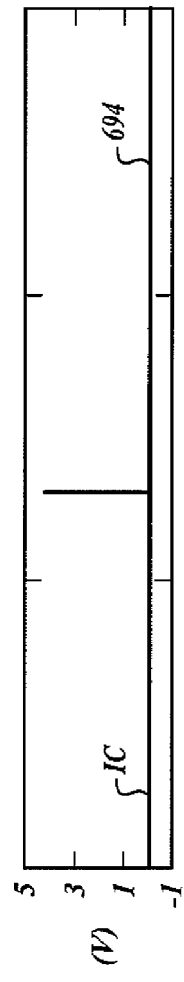
Figure 6E:
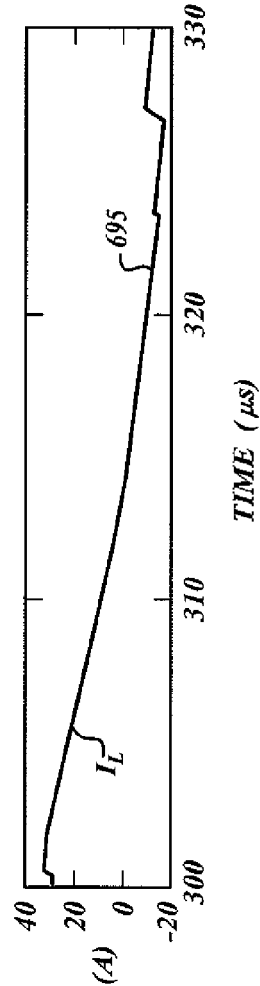

FIGS. 6A-6E illustrates timing diagrams of waveforms of embodiments of signals of the circuit of FIG. 5. FIG. 6A illustrates waveform 690 of an embodiment of signal SSCTL. FIG. 6B illustrates waveform 691 of an embodiment of signal PWMRAMP, and waveform 692 of an embodiment of signal Comp. FIGS. 6C-6E illustrate waveforms 693, 694, and 695 of embodiments of signal Block_on, signal IC, and current IL, respectively.

As shown in waveforms 690, 691, and 692, the first pulse occurs in signal SSCTL when signal Comp is below signal PWMRAMP as part of the normal pulse width modulation for the voltage regulation. At this point, as shown by waveform 693, signal Block_on is off. However, shortly thereafter, signal Comp drops below the valley level of signal PWMRAMP, as shown in FIG. 6B. At this point, as shown by waveform 693, signal Block_on goes high. While signal Block_on is high, signal SSCTL stays low, as shown in FIG. 6A, which blocks the synchronous switch from turning on. This allows current $I_L$ to decrease relatively rapidly during the unloading transient, as shown by waveform 695.

Eventually, current $I_L$ reaches 0, as shown in waveform 695. At about this time, signal IC goes high, as shown by waveform 694. When this occurs, signal Block_on is de-asserted, as shown in waveform 693. When signal Block_on is de-asserted, since signal Comp is still below signal PWM-RAMP, signal SSCTL goes high, which causes the synchronous switch to turn on. This allows current IL to go negative, so that current $I_L$ continues decreasing, as shown by waveform 695. Eventually, the unloading transient ends, at which point signal Comprises above the minimum voltage of signal PWMRAMP, as shown in FIG. 6B. At this point, normal PWM operation and normal regulation resumes, as shown.

Figure 7:
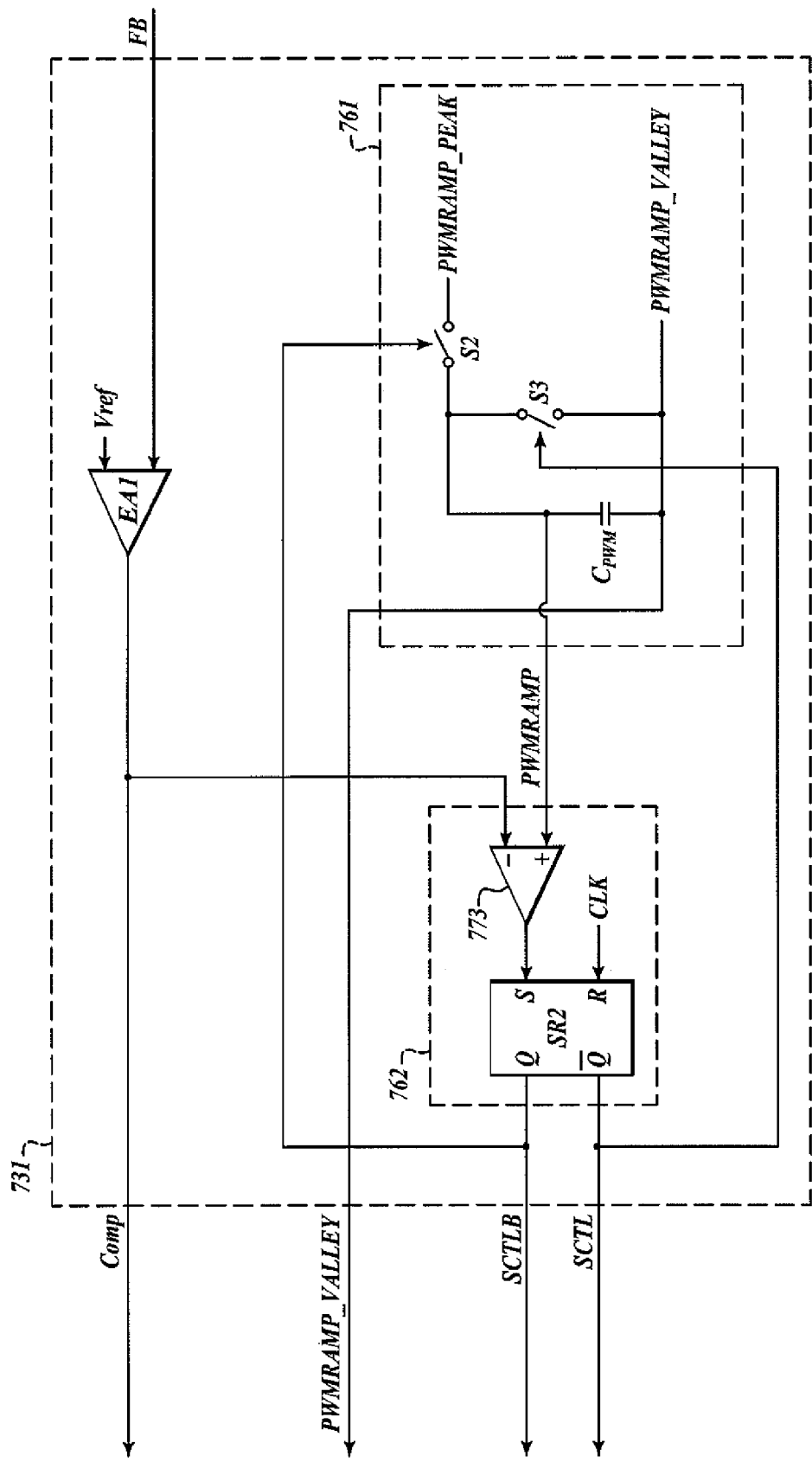
FIG. 7 illustrates a block diagram of an embodiment of the switch control circuitry of FIG. 3, arranged in accordance with aspects of the present invention.

FIG. 7 illustrates a block diagram of an embodiment of the switch control circuitry 731, which may be employed as an embodiment of switch control circuit 331 of FIG. 3.

PWM Ramp generator 761 includes switch S1, switch S2, and capacitor $C_{PWM}$. Pulse width modulator 762 includes comparator 773 and SR latch 762. SR latch SR2 is arranged to receive clock signal CLK at its R input. Also, signal PWM-RAMP_PEAK is employed as the maximum of peak voltage of signal PWMRAMP.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for regulation, comprising:
a buck regulator controller, wherein the buck regulator controller is arranged to provide a first switch control signal to control a first switch to control an inductor current, and further arranged to provide a synchronous switch control signal to control a synchronous switch, wherein the buck regulator controller includes:
an unloading event detection circuit that is arranged to assert an unload event signal if an unloading event is detected;
an inductor current detection circuit that is arranged to assert an inductor current detection signal if the inductor current is approximately zero; and
a synchronous switch control logic circuit that is arranged to provide the synchronous switch control signal, wherein the synchronous switch control logic circuit is arranged to provide the synchronous switch control signal such that:
if the unload event signal is asserted, and the inductor current detection signal is not asserted,
the synchronous switch control logic circuit blocks the synchronous switch from turning on; and such that
the synchronous switch control logic circuit stops blocking the synchronous switch from turning on if the inductor current detection signal is asserted.

2. The circuit of claim 1, wherein
the unloading event detection circuit is arranged to assert the unload event signal if a current associated with a load driven by the circuit for regulation experiences a load step decrease.

3. The circuit of claim 1, wherein
the unloading event detection circuit is arranged to assert the unload event signal if a load driven by the circuit for regulation is disconnected from the circuit for regulation.

4. The circuit of claim 1, wherein
the buck regulator controller further includes:
a soft-start circuit, wherein the buck regulator controller is arranged to control regulation of an output signal, the soft-start circuit that is arranged to control a soft-start of the regulation of the output signal, the soft-start circuit is arranged to assert a soft-start done signal when soft-start is not occurring, and wherein the unloading event circuit includes logic circuitry that is arranged to ensure that the unloading event signal is not asserted when the soft-start done signal is not asserted.

5. The circuit of claim 1, further comprising:
a current sense circuit that is arranged to provide a current sense signal that is proportional to the inductor current, wherein the inductor current detection circuit includes a comparator that is arranged to assert the inductor current detection signal if the current sense signal is approximately zero.

6. The circuit of claim 1, further comprising:
switch control circuitry that is arranged to provide the first control signal, wherein the switch control circuitry includes:
a comparison circuit that includes at least one or an error amplifier or a comparator, wherein the buck regulator controller is arranged to control regulation of an output signal; wherein the comparison circuit has at least a first input that is arranged to receive a feedback signal that is based, at least in part, on the output signal, and wherein the comparison circuit further has at least a second input that is arranged to receive a reference voltage.

7. The circuit of claim 6, wherein
the unloading event detection circuit includes:
a comparator that is arranged to compare the feedback signal with a second reference voltage that is greater than the reference voltage.

8. The circuit of claim 1, further comprising:
switch control circuitry that is arranged to provide the first switch control signal, wherein the switch control circuitry includes:
an error amplifier having at least a first input, a second input, and an output, wherein the error amplifier is arranged to receive a feedback signal at the first input of the error amplifier, and further arranged to provide an error signal at the output of the error amplifier;

a pulse width modulation ramp generator circuit that is arranged to provide a pulse width modulation ramp signal such that a pulse width modulation ramp valley signal is a minimum voltage of the pulse width modulation ramp signal; and a pulse width modulation circuit that is arranged to provide pulse width modulation output signal by pulse-width modulating the error signal, wherein the pulse width modulation is based, at least in part, on the pulse width modulation ramp signal.

9. The circuit of claim 8, wherein
the unloading event detection circuit includes a first comparator having at least a first input that is arranged to receive the error signal, a second input that is arranged to receive the pulse width modulation ramp valley voltage, and an output that is arranged to provide a first comparator output signal, wherein the unload event signal is based, at least in part, on the first comparator output signal.

10. The circuit of claim 1, further comprising:
the first switch, wherein the first switch is coupled to a switch node; and
the synchronous switch, wherein the synchronous switch is coupled to the switch node.

11. The circuit of claim 10, wherein
the inductor current detection circuit includes a comparator having at least a first input, and an output, wherein the first input of the comparator is coupled to the switch node, the comparator is arranged to provide a comparator output signal at the output of the comparator, and wherein the inductor current detection signal is based, at least in part, on the comparator output signal.

12. The circuit of claim 11, wherein
the comparator is arranged to compare a voltage at the switch node with a reference voltage, wherein the reference voltage is negative, the reference voltage has a magnitude greater than zero, the magnitude of the reference voltage is less than a forward diode drop associated with a body diode of the synchronous switch, and wherein the comparator is arranged to assert the comparator output signal if the voltage at the switch node is greater than the reference voltage.

13. A circuit for regulation, comprising:
a buck regulator controller, including:
a pulse width modulation (PWM) ramp generator circuit having at least a PWM ramp output and a PWM valley level output;
an error amplifier having at least a feedback input, a reference input, and an output;
a pulse width modulation circuit having at least a first input that is coupled to the output of the error amplifier, a second input that is coupled to the PWM ramp output, and an output;
a first comparator having at least a first input that is coupled to the output of the error amplifier, and a second input that is coupled to the PWM valley level output of the PWM ramp generator;
a first logic gate having at least a first input that is coupled to the output of the first comparator, and an output;
a latch circuit having at least a first input, a second input, and an output, wherein the output of the first logic gate is coupled to the first input of the latch circuit;
a second comparator having at least a first input that is coupled to an inductor, and an output;

a second logic gate having at least a first input that is coupled to the output of the second comparator, and an output; and
a third logic gate having at least a first input that is coupled to the output of the PWM ramp generator, a second output that is coupled to the output of the latch circuit, and an output.

14. The circuit of claim 13, wherein
the PWM generator is arranged to provide a PWM ramp signal at the PWM output, and to provide the valley voltage of the PWM ramp signal to the PWM valley output.

15. The circuit of claim 13, wherein
the latch circuit is an SR latch, the first input of the SR latch is the S input of the SR latch, and the second input of the SR latch is the R input of the SR latch.

16. The circuit of claim 13, wherein
the first logic gate further has at least a second input that is arranged to receive a soft-start done signal that is asserted when soft start is not occurring, and
wherein the first logic gate is an AND gate.

17. The circuit of claim 13, further comprising:
a delay circuit having at least an input that is coupled to the output of the latch circuit, and an output;
a fourth logic gate, wherein the fourth gate has at least a first input that is coupled to the output of the second comparator, a second input that is coupled to the output of the delay circuit, and an output that is coupled to the first input of the second logic gate, wherein the output of the second comparator is coupled to the first input of the second logic gate via the fourth logic gate, wherein the second logic gate further has at least a second input; and
a one-shot circuit having at least an input that is coupled to the output of the first logic gate, and an output that is coupled to the second input of the second logic gate.

18. A method for regulation, comprising:
performing buck switching regulation of an output signal driving a load, including:
providing a first switch control signal to control a first switch such that the first switch control signal is based, in part, on the output signal, wherein the first switch is coupled to an inductor;
providing a synchronous switch control signal to control a synchronous switch such that the synchronous switch control signal is based, in part, on the first switch control signal, wherein providing the synchronous switch control signal includes:
detecting whether an unloading event has occurred;
asserting an unload event detect signal if an unloading event is detected;
detecting whether an inductor current of the inductor is approximately zero;
asserting an inductor current detection signal if the inductor current is detected as being approximately zero;
if the unload event signal is asserted, and the inductor current detection signal is not asserted:
blocking the synchronous switch from turning on while the unload event signal is asserted; and
if the inductor current detection signal is subsequently asserted while the unload event signal is still asserted:
cease blocking the synchronous switch from turning on.

19. The method of claim 18, wherein
an unloading event is detected if a load step decrease occurs in the load.

20. The method of claim 18, wherein
the first switch is connected to a switch node;
the synchronous switch is connected to the switch node;
an inductor is connected to the switch node; and
wherein detecting whether the inductor is approximately zero is accomplished by determining whether a voltage at the switch node is greater than a reference voltage, wherein the reference voltage is a negative voltage having a magnitude that is: greater than zero and less than a forward voltage associated with a body diode of the synchronous switch.

* * * * *

UNITED STATES PATENT AND TRADEMARK OFFICE
CERTIFICATE OF CORRECTION

PATENT NO.        : 7,705,579 B1
APPLICATION NO.   : 12/014014
DATED             : April 27, 2010
INVENTOR(S)       : George A. Hariman et al.

It is certified that error appears in the above-identified patent and that said Letters Patent is hereby corrected as shown below:

On page 2, in column 1, under "Other Publications", line 2, delete "Rectifer," and insert -- Rectifier, --, therefor.

On page 2, in column 2, under "Other Publications", line 2, delete "Rectifer," and insert -- Rectifier, --, therefor.

In column 5-6, line 58-67 & line 1-4, delete "Error amplifier EA1 is arranged to receive reference voltage Vref and feedback signal FB. Further, error amplifier EA1 is arranged to provide error signal Comp based, in part, a difference between reference voltage Vref and feedback signal FB. PWM ramp generator 361 is arranged to provide PWM ramp signal PWMRAMP and signal PWMRAMP_VALLEY. Also, signal PWMRAMP is a sawtooth signal having a minimum voltage (i.e., valley voltage) of PWMRAMP_VALLEY. Pulse width modulator 362 is arranged to receive signal Comp and signal PWMRAMP. Further, pulse width modulator 362 is arranged to provide signal SCTL by pulse width modulating signal Comp, and to provide signal SCTLB such that signal SCTLB is the logical opposite of signal SCTL." and insert the same on Col. 5, Line 59 as a new paragraph.

In column 8, line 60, delete "VBD" and insert -- –VBD --, therefor.

In column 9, line 32, delete "Comprises" and insert -- Comp rises --, therefor.

Signed and Sealed this

Second Day of November, 2010

David J. Kappos
*Director of the United States Patent and Trademark Office*